United States Patent [19]

Pearson et al.

[11] 4,443,926

[45] Apr. 24, 1984

[54] METHOD OF ASSEMBLING SHOCK ABSORBERS

[75] Inventors: Robert M. Pearson, Plymouth; Robert J. Womac, Belleville, both of Mich.

[73] Assignee: Ford Motor Company, Dearborn, Mich.

[21] Appl. No.: 346,476

[22] Filed: Feb. 8, 1982

[51] Int. Cl.³ .............................................. B23P 11/00
[52] U.S. Cl. ........................................ 29/436; 29/434; 29/453; 188/269; 188/281; 188/315
[58] Field of Search ...................... 29/434, 157 R, 453, 29/436; 188/269, 315, 281

[56] References Cited

U.S. PATENT DOCUMENTS

| | | | |
|---|---|---|---|
| 2,367,977 | 1/1945 | Thornhill | 188/269 X |
| 2,571,279 | 10/1951 | Myklestad | 188/315 |
| 2,997,291 | 8/1961 | Stultz | 188/315 |
| 3,024,875 | 3/1962 | Stultz | 188/269 |
| 3,556,268 | 1/1971 | Fister | 188/315 X |
| 3,750,855 | 12/1971 | Peddinghaus | 188/269 |
| 3,752,270 | 8/1973 | Valdespino | 188/281 |
| 3,775,830 | 11/1971 | Van Ryn et al. | 29/453 |
| 3,901,359 | 8/1975 | Jentsch | 188/269 |
| 4,043,452 | 8/1977 | Ross | 29/453 |

*Primary Examiner*—Charlie T. Moon
*Assistant Examiner*—Ronald S. Wallace
*Attorney, Agent, or Firm*—Joseph W. Malleck; Olin B. Johnson

[57] ABSTRACT

A method of assembly of a shock absorber is disclosed. A cell, formed of plys of polymeric material impervious to hydraulic fluid and a high molecular gas, while pervious to air and water vapor, is wrapped about the inner tubular container, secured thereto by clips at a midsection of the cell, and effectively inserted into the outer tubular container even though the cell contains a predetermined quantity of gas. The containers can preferably be filled with hydraulic fluid prior to insertion.

8 Claims, 10 Drawing Figures

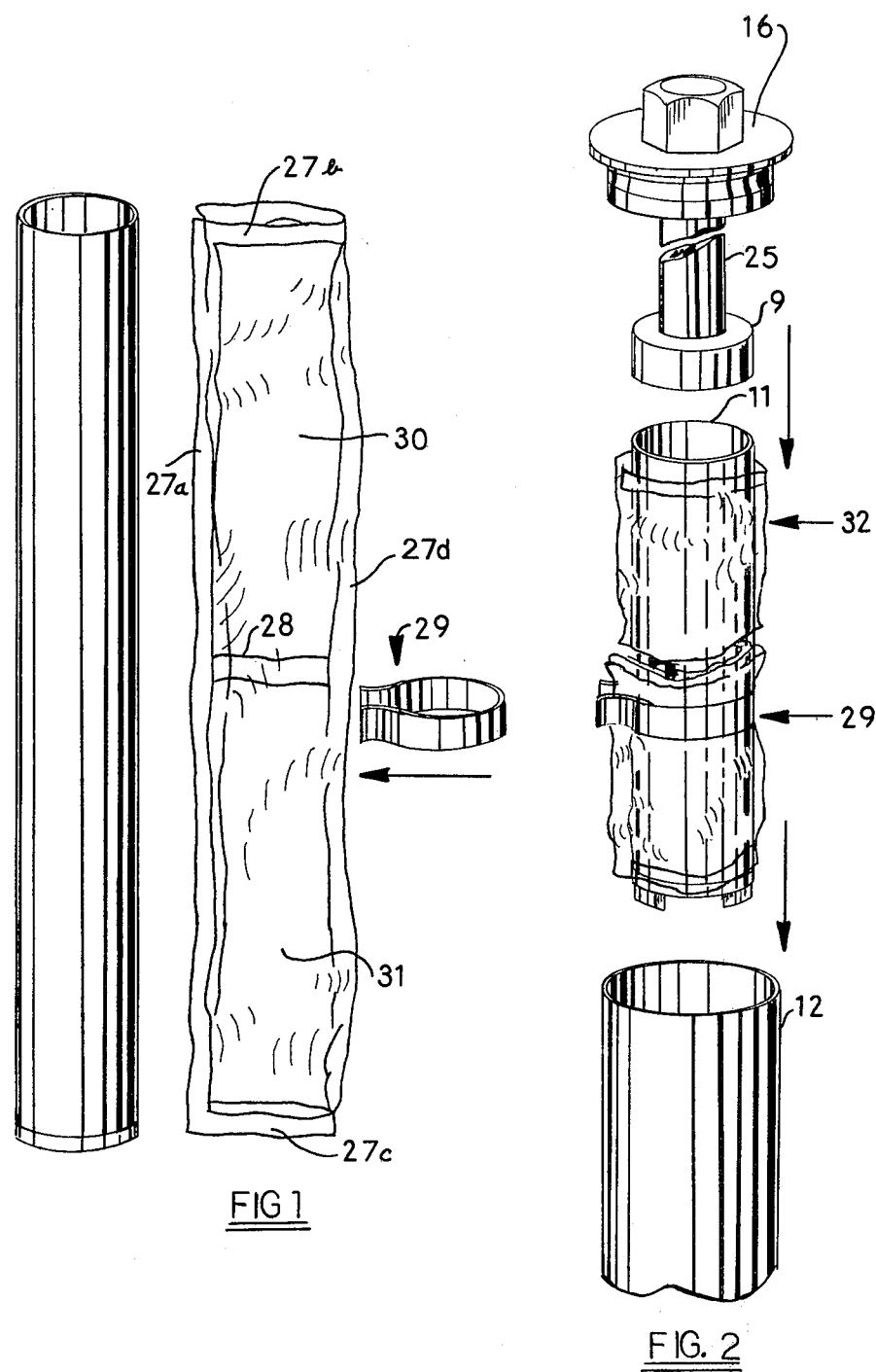

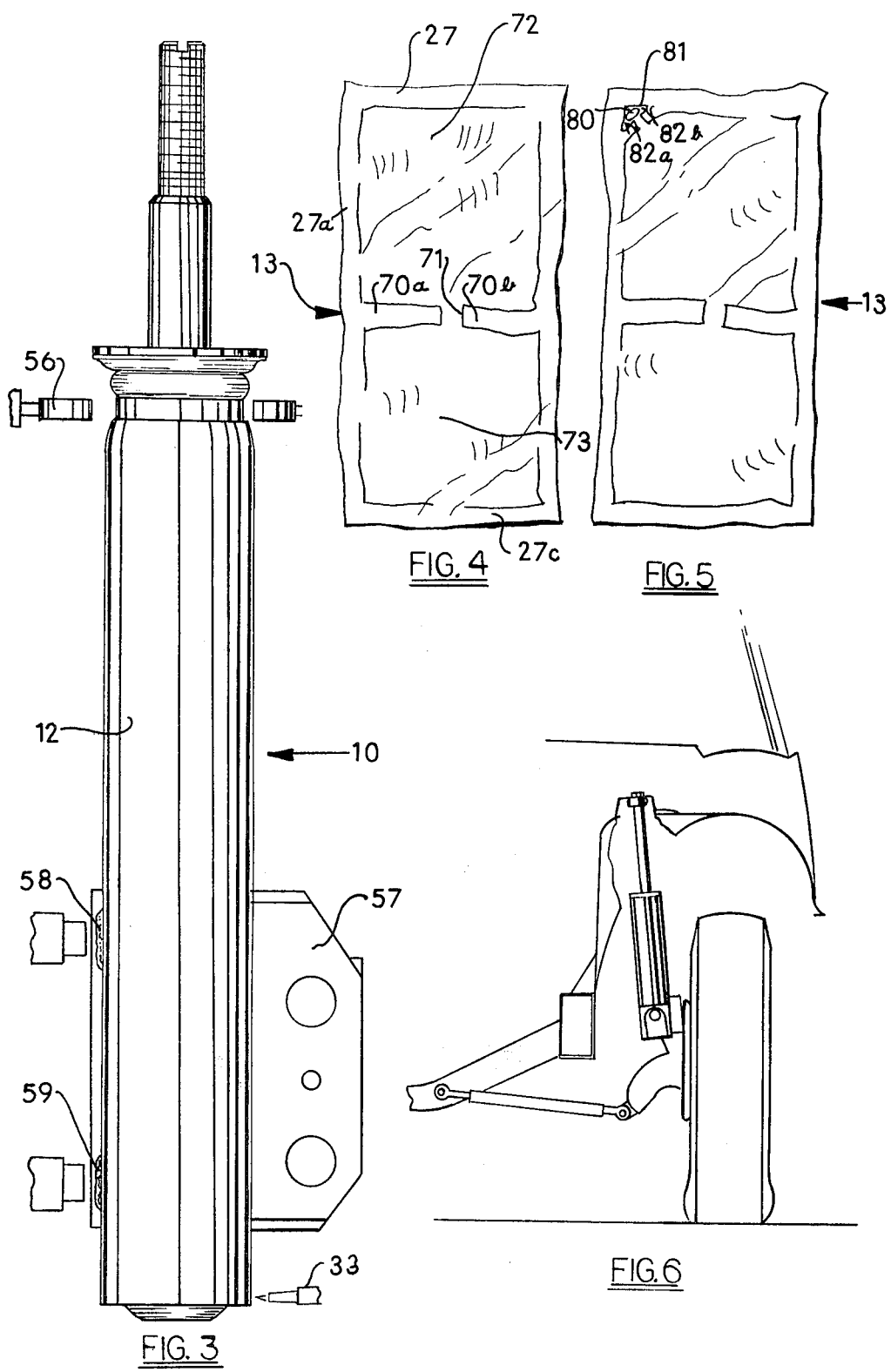

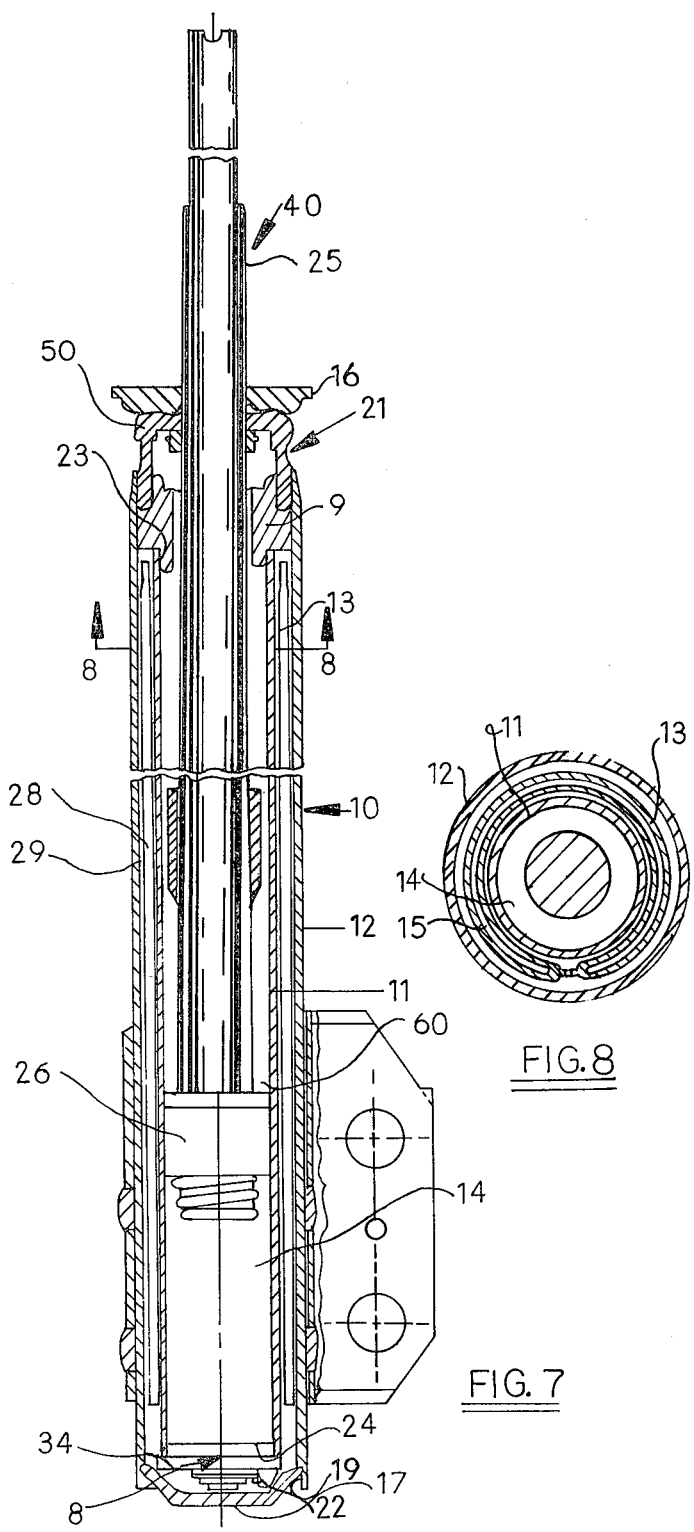

METHOD OF ASSEMBLING SHOCK ABSORBERS

BACKGROUND OF THE INVENTION

Conventional shock absorbers have a reservoir to receive hydraulic fluid displaced from the main working cylinder. However, besides acting as a space into which hydraulic fluid can be displaced from the working cylinder during reciprocating motion of the shock absorber piston, such reservoir also serves to supply hydraulic fluid for refilling the working cylinder and to make up for fluid loss due to seepage.

A volume of air is usually retained in the reservoir to allow for quick pulsing action of the fluid between the cylinder and the reservoir. The air is needed to act as a compensation space or air cushion during such pulsation. Unfortunately, such pulsation causes a high degree of turbulence in the hydraulic fluid, causing the fluid to be aerated and frothed thereby slowing the reaction time of pulsation.

One useful piece of apparatus to overcome such aeration or frothing is a deformable semi-permeable gas cell that allows air or light substances to be absorbed into the interior of the cell, resulting in a small increase in gas volume that compensates for oil seepage. Such gas cell typically is impermeable to hydraulic fluid and the enclosed gas (see U.S. Pat. Nos. 2,997,291 and 3,024,875). Freon is typically used as the gas and is introduced by needle injection, the needle opening being hot staked to form a seal. The volume of the cell is selected so that at the highest temperature expected and under a full compression stroke, in normal operation, the cell will not be fully collapsed. The deformable cell prevents aeration and keeps the hydraulic fluid under pressure at all times.

Although the principle of the flexible freon cell has been well received, its benefits have not always been realized because of difficulties associated with the installation of the cell. It is conventional to install the freon cell by the following steps: (a) an open ended outer tube is filled with oil, (b) the freon gas filled cell (usually shaped as a slim pillow formed by two sheets of nylon material) is slid into the oil filled outer tube, preferably by use of a mandrel about which the cell is wrapped, (c) the mandrel is withdrawn, (d) the inner tube assembly, including the piston, is slid into available space defined within the curled cell residing in the outer tube, and (e) the outer tube is closed, such as by welding of end assemblies.

The problems presented by such installation include:

(1) The cell, being flexible and containing a gas, does not stay in a slim, controlled, cylindrical shape after withdrawal of the mandrel. To the contrary, the cell, as a result of gas pressure, billows out and is squeezed during the insertion step of the inner tube assembly. The design of the space receiving the cell in the fully assembled device is narrow by necessity. Gas is thus forced to one end of the single cell and the remainder of the cell is collapsed. This condition is further complicated by the unrefrigerated storage of the cell prior to installation whereby it is allowed to absorb additional air from the surrounding environment, exaggerating the forcing action.

(2) The manner in which the gas containing cell must be inserted into the oil filled tube is slow and awkward, resulting in low productivity and requiring an excessive amount of workmen to carry out the assembly task. Thus, the normally intended virtues for such freon cell are not fully realized and can cause less than satisfactory shock absorber operation.

SUMMARY OF THE INVENTION

The invention is a method of assembly of shock absorbers having inner and outer concentrically nested tubular containers between which is sandwiched a polymeric film cell containing a high molecular weight gas, the cell comprising a substance impervious to hydraulic fluid and the high molecular gas, while being pervious to air and water vapor. The cell is formed as a pillow from two plys of polymeric material, said plys being sealed at peripheral margins and at ribs extending inwardly at an intermediate section thereof. The method comprises essentially:

(a) wrapping the cell about the inner tubular container to form a jacket thereabout, the cell containing a predetermined amount of high molecular gas at a predetermined pressure;

(b) securing the ribs of the cell to the inner tubular container for defining an assembly;

(c) inserting the assembly into the outer tubular container;

(d) either before or after step (c), applying closure means to one end of said outer tubular container and closure means having valve means to one end of said inner tubular container;

(e) in direct succession after step (d), filling the chambers defined within and between said tubular containers with hydraulic fluid and inserting piston means into said inner tubular container; and (f) sealing said tubular containers to complete said shock absorber.

It is advantageous if the cell is formed with the pre-insertion of a rupturable capsule (containing high pressure gas) stored in a receptacle of the cell. The capsule can then be ruptured after installation of the cell into the outer tubular container, further assisting installation. The laterally extending ribs can be formed in a manner to extend completely across the cell to bifurcate, or the laterally extending ribs can be defined to allow for a limited passage between the divided sections of the cell. The passage may be formed with a predetermined throat area to define a venturi opening, such opening allowing high molecular gas to transfer between said sections under a delayed period of time but to inhibit transfer during a relatively short period of time, i.e., during the time period for insertion of the assembly into the outer tubular container.

It is preferred that securement of the laterally extending ribs be by use of a clip shaped as a C and effective to apply a gripping pressure to hold the middle section of the cell clamped to the inner tubular container at least during assembly. The clip may have a spring force in the general range of 10-15 pounds. It is desirable that the polymeric cell be comprised of nylon, preferably consisting of type 6 nylon film and that the high molecular gas be comprised of freon having a purity of typically 99%.

DESCRIPTION OF THE DRAWINGS

FIGS. 1 and 2 illustrate, respectively, stages of assembly of the cell onto the inner tubular container of the shock absorber and, as an assembly, into the outer tubular container of the shock absorber;

FIG. 3 is an elevational view of the substantially assembled shock absorber illustrating the positioning of electrodes for carrying out the welding of supports and closure means for the containers;

FIGS. 4 and 5 are side elevational views of the polymeric cell employed as a component of the shock absorber, each of the figures illustrating alternative modifications of the cellular construction;

FIG. 6 is a schematic illustration of a portion of an automobile, illustrating the installed position of the shock absorber as a strut;

FIG. 7 is a central sectional view of a completed shock strut embodying the principles of this invention;

FIG. 8 is a sectional view taken substantially along line 8—8 of FIG. 7;

DETAILED DESCRIPTION

Figures 9, 10:
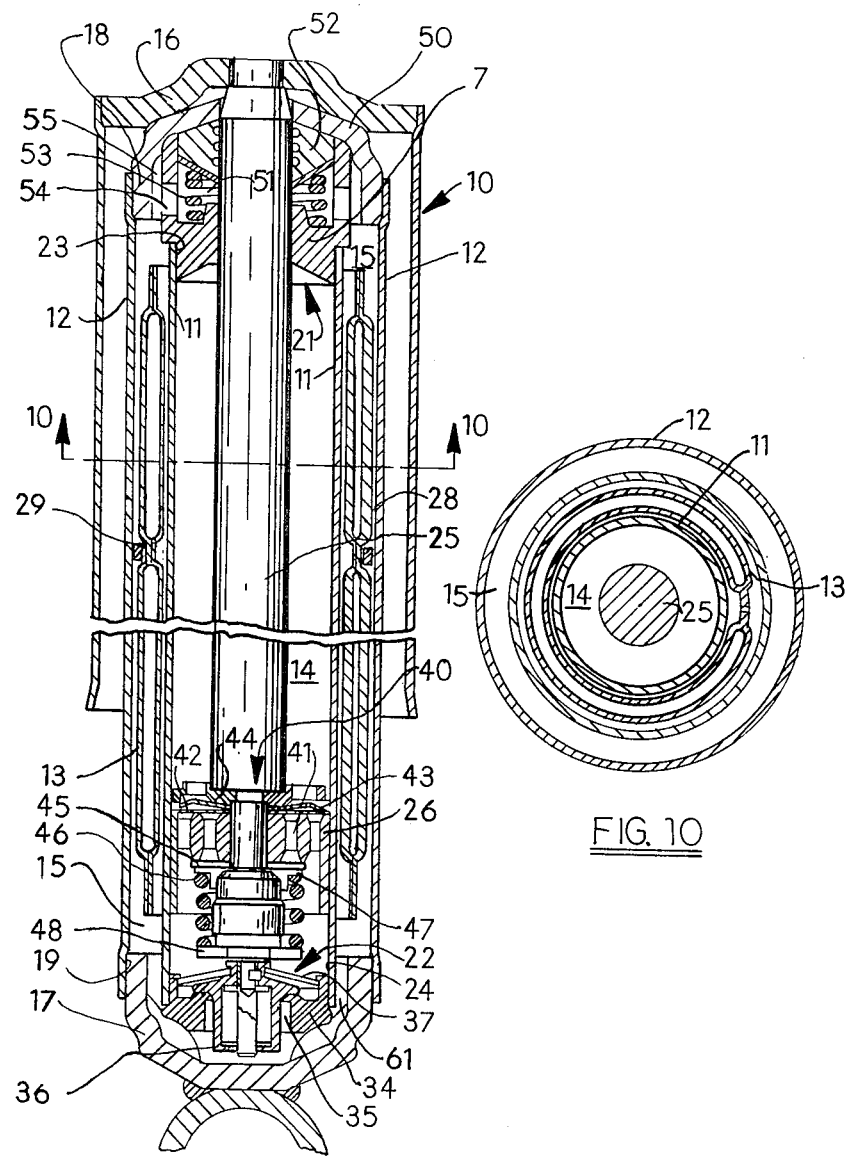
FIG. 9 is a central section view of a shock absorber embodying the principles of this invention.
FIG. 10 is a sectional view taken along line 10—10 of FIG. 9.

The method of assembly of this invention pertains to sock absorbers, and particularly a strut 10 which typically has inner and outer tubular containers 11-12 concentrically disposed one within the other, as shown in FIGS. 7 and 8. Between the inner and outer containers is sandwiched a polymeric film bag or cell 13 containing a predetermined quantity of high molecular weight gas. The containers can be closed in the later steps of the assembly to form cylindrical chambers 14-15 for containing hydraulic fluid. The closure can be effected by the use of end caps 17 welded to lower open sections 19 of the outer tubular container 12 and by the use of valve means 22 supported within the lower end 24 of the inner tubular container. The upper end of each of the containers is closed by a means 21 receiving the piston rod 25. In the case of the strut, a bearing 9 is used to cooperate with the seal. A piston 26, carried by shaft 25, has its motion controlled by the transfer of hydraulic fluid between the portions of the inner chamber 14 below and above the piston.

As can be seen from FIGS. 7 and 8, the cylindrical space 15 within which the polymeric film cell 13 must fit is extremely close. The flexibility of the cell itself, responding to internal pressures within the cell, frustrates attempts to control the shape of such cell during assembly. Moreover, the shape of such cell 13 can change as a result of absorption of gases, such as air, prior to installation, particularly when the cell is stored in humid conditions prior to assembly. Attempting to hold the cell in close conformity with the outer surface of the inner cylinder 11, particularly when the outer tube 12 has been previously filled with hydraulic fluid, is extremely tedious, time consuming and froth with complications for the assembler.

The method of this invention overcomes these difficulties by employing the following steps:

(1) A polymeric, deformable film cell 13 is wrapped about the inner cylinder 11 to form a thin jacket thereabout. The wrapping may be carried out manually. The cell 13 itself is preferably formed in the shape of a flat, elongated bag as shown curled in FIG. 1; in the laid-out condition, as shown in FIGS. 4 and 5, the bag is readily seen to have a height at least twice its width. The cells are formed from two plys of polymeric material, sealed at peripheral margins 27a-27d and at rib 28 extending laterally across at an intermediate section thereof. The polymeric material of the cell is constituted of a material impervious to hydraulic fluid and oil as well as high molecular gas, such as freon gas. The material is, however, also pervious to air, water vapor and hydraulic vapors. It has been found that the material should preferably be comprised of nylon consisting of type 6 film having a minimum tensile strength of 8500 psi (50 MPa), an elongation at break of at least 200%, a melting point of 210°-225° C. and a specific gravity of 1.10-1.18. Thus, the gas in the cell within the reservoir chamber 15 is completely isolated from the hydraulic fluid; there is no adsorption of the gas into the hydraulic fluid and thus aeration of the hydraulic fluid is eliminated.

(2) The deformable cell 13, either containing a predetermined amount of gas or containing means for expanding gas therein at a later time, is secured to the inner cylinder tube 11 by means 29 that attach at the laterally extending rib 28 (which can be a seal seam). Preferably, this is carried out by the use of a C-clip formed particularly of aluminum and effective to maintain an inward clamping force of about 10-15 pounds; the clip secures the midsection of the cell to the inner cylinder forming an assembly 32. In the embodiment of FIGS. 1 and 2, the laterally extending rib may extend completely across the width of the cell, separating the upper and lower portions of the cell into two independent sections 30-31. The midsection seam 28 extends entirely across the cell.

The gas contained within the cell is freon (monochlorotrifluoromethane) having an air content of up to one percent by volume, no chloride ion content, a water content of up to 0.001% by weight, boiling point at one atmosphere of −114 to −115° F., and high boiling impurities at −58° F. of up to 0.05% by volume.

(3) The assembly 32 is then inserted into the outer tubular container 12, as shown in FIG. 2.

(4) Either before or after step (3), closure means are applied to one end of the outer container and closure means carrying valve means are applied to one end of the inner container. Container 12 is closed at its bottom end by a closure cap 17 welded in place by an electrode 33 positioned as shown in FIG. 3. Prior to insertion, container 11 is preferably closed at its bottom end by means 8 having a member 34 carrying compression valve means 22.

For a shock absorber (as shown in FIGS. 9 and 10), member 34 has a central opening 35 that receives the valve member 36 held on an annular seat by means of a finger spring 37. The spring 37 is very light and has little resistance to upward opening of the valve 36 from its seat whereby, in operation, relatively free flow of hydraulic fluid is permitted from reservoir 15 into cylindrical chamber 14 containing the piston. The valve 36 carries a resistance valve 38 that ensures positive flow of hydraulic fluid from the chamber 14 into the reservoir during the compression stroke of the shock absorber.

(5) The inner container 11 is filled with hydraulic fluid to a predetermined level after completing step (4). The piston means 40 may then be inserted into the filled inner container. The piston 26, for the strut of FIG. 7, may have rebound valving. For the shock absorber of FIG. 9, the piston has an annular arrangement of axially extending passages 41 extending through the piston, each of which are closed at their upper ends by means of a disc valve 42 held on seats provided around each of the passages by means of a spring 43. A retainer disc 44 controls the maximum degree of flexure of the valve member 42. The piston in FIG. 9 may have a second series of annularly arranged passages extending through the piston which are closed by a poppet valve 45 held on seats around the second passages by means of a compression spring 46 disposed between the retainer 47 and the head 48 of a retaining nut by which the piston and valve assembly are held in assembled relationship.

(6) The entire assembly is sealed for operation; the upper end 23 of the inner tube is closed by means 21 having a cap 16 and metallic seal 50 which is welded in place, as shown in FIG. 3 by the positioning of electrode 56. For the strut of FIG. 7, means 21 comprises the metallic seal 50 and a bearing 9. For the shock absorber of FIG. 9, means 21 comprises an element 7 which acts as a rod guide having a chamber 51 receiving a resilient rod seal member 52 held under compression by means of compression spring 53. The seal chamber 51 is connected with the reservoir chamber through the opening 54 and one or more passages 55 between the end cap 16 and metallic seal 50.

As shown in FIG. 6, the strut can be attached, with the upper end of the rod 25 typically connected to the chassis of a vehicle. The lower portion of the outer container carries a suitable bracket 57 (welded at spots 58 59) for attachment to the spider of the wheel. The shock absorber strut functions to soften the abrupt movement of the chassis with respect to the ground wheels.

In the normal operation of the shock absorber strut, movement of piston 26 downwardly toward the base valve 22 in the compression stroke causes hydraulic fluid to be displaced from the chamber 14 into the chamber 15 through valve 42. This displacement of fluid through valve 22 controls the compression stroke of the shock absorber. On the rebound stroke, that is, on the upward movement of the piston, hydraulic fluid will be displaced from chamber 14 into chamber 60. In the case of the shock absorber (FIG. 9), the volume of fluid thus displaced through valve 45 will be insufficient to fill the total volume of chamber 60. "Make up" of hydraulic fluid will be received from the reservoir chamber 15 through passage 61, which flow of hydraulic fluid opens valve 36 against substantially no resistance and allows relatively free flow of the hydraulic fluid from the reservoir chamber 15 into chamber 60.

In prior art shock absorbers, it is necessary for an air space to be provided in the reservoir chamber. The constant pulsing of the displaced fluid into and out of the reservoir chamber creates high turbulence of the hydraulic fluid in the reservoir chamber resulting in absorption of air into the hydraulic fluid, thereby aerating the hydraulic fluid. However, the use of the air cell of this invention, in its installed condition, does prevent aeration of the hydraulic fluid and tends to maintain the hydraulic fluid under pressure at all times.

During normal operation of a prior art shock absorber, reciprocation of the piston rod through its seal produces a slow migration of hydraulic fluid from within the shock absorber to the exterior thereof. That is, over a period of time, hydraulic fluid is lost from the interior of the shock absorber so that after a time the interior of the shock absorber will be less than completely full when it is fully extended. When this occurs, the pressure and the void thus created becomes less than the atmosphere, with the result that air will migrate into the interior of the shock absorber and be absorbed into the oil. The constant pumping action of the void to draw air into the shock absorber on operation of the same results again in aeration of the hydraulic fluid and less than adequate pressure on the fluid.

In this invention, the gas cell expands or grows over the life of the shock absorber in a manner that the growth or expansion of the cell will compensate for the loss of hydraulic fluid from the shock absorber. At all times during the life of the shock absorber, when the device is fully extended, the hydraulic fluid will fully occupy the reservoir chamber 15.

FIG. 4 illustrates a first modification that can be made to the preferred embodiment. The laterally extending ribs (seams) do not extend completely across the cell but terminate to define a venturi passage 71 between the upper chamber 72 of the cell and the lower chamber 73. Thus, during the insertion step, any squeezing of the cell will not result in quick transfer of gas to one side of the cell leaving the other side substantially in collapse. The passage delays any sizable momentary gas transfer, but permits gradual gas communication between sides 72–73 after installation to permit the cell to function uniformly.

FIG. 5 illustrates still another modification wherein the cell is formed with the pre-insertion of a rupturable capsule 80 stored in a receptacle 81 defined by corner biased ribs (seams) 82a–82b. The capsule 80 can be ruptured after installation of the cell into the outer tubular container. This assists installation because the cell is installed in a completely deflated condition.

We claim:

1. A method of assembling a shock absorber for use in an automotive vehicle, the shock absorber having inner and outer concentrically nested tubular containers between which is sandwiched a polymeric film cell containing a high molecular weight gas, said cell being impervious to hydraulic fluid and said gas but pervious to air and water vapor, said cell being formed as a pillow from two plys of polymeric material sealed at peripheral margins and sealed at ribs extending laterally inwardly at intermediate sections thereof, the steps comprising:
    (a) wrapping said cell about the inner tubular container of said absorber to form a jacket thereabout, said cell containing a quantity of high molecular gas therein at predetermined pressure;
    (b) mechanically securing the laterally extending ribs of said cell to the inner tubular container for defining an assembly;
    (c) inserting said assembly into the outer tubular container; and
    (d) after one of step (b) and step (c), applying closure means to one end of said outer tubular container and closure means having fluid valve means to a corresponding one end of said inner tubular container to define chambers within the inner container and between said tubular containers;
    (e) in direct succession after step (d), filling said chambers with hydraulic fluid and inserting piston means therein; and
    (f) sealing said tubular containers to complete said shock absorber.

2. The method as in claim 1, in which a rupturable capsule containing high pressure, high molecular weight gas is contained in a portion of said cell prior to step (a), said capsule being ruptured after step (c) is completed and before step (f).

3. The method as in claim 1, in which said ribs extend completely laterally across said cell to bifurcate the cell into two independent gas holding chambers.

4. The method as in claim 1, in which said ribs extend partially across said cell to define a passage between the upper and lower chambers of said cell.

5. The method as in claim 4, in which said passage is restricted to provide a venturi throat section.

6. The method as in claim 1, in which said securing step is a clip.

7. The method as in claim 6, in which said clip is comprised of a C-shaped metallic member effective to apply a clamping force of about 10–15 pounds.

8. The method as in claim 1, in which said cell is comprised of polyamide nylon film and in which the high molecular weight gas is comprised of freon having a purity of at least 99%.

* * * * *